United States Patent Office 2,955,579
Patented Oct. 11, 1960

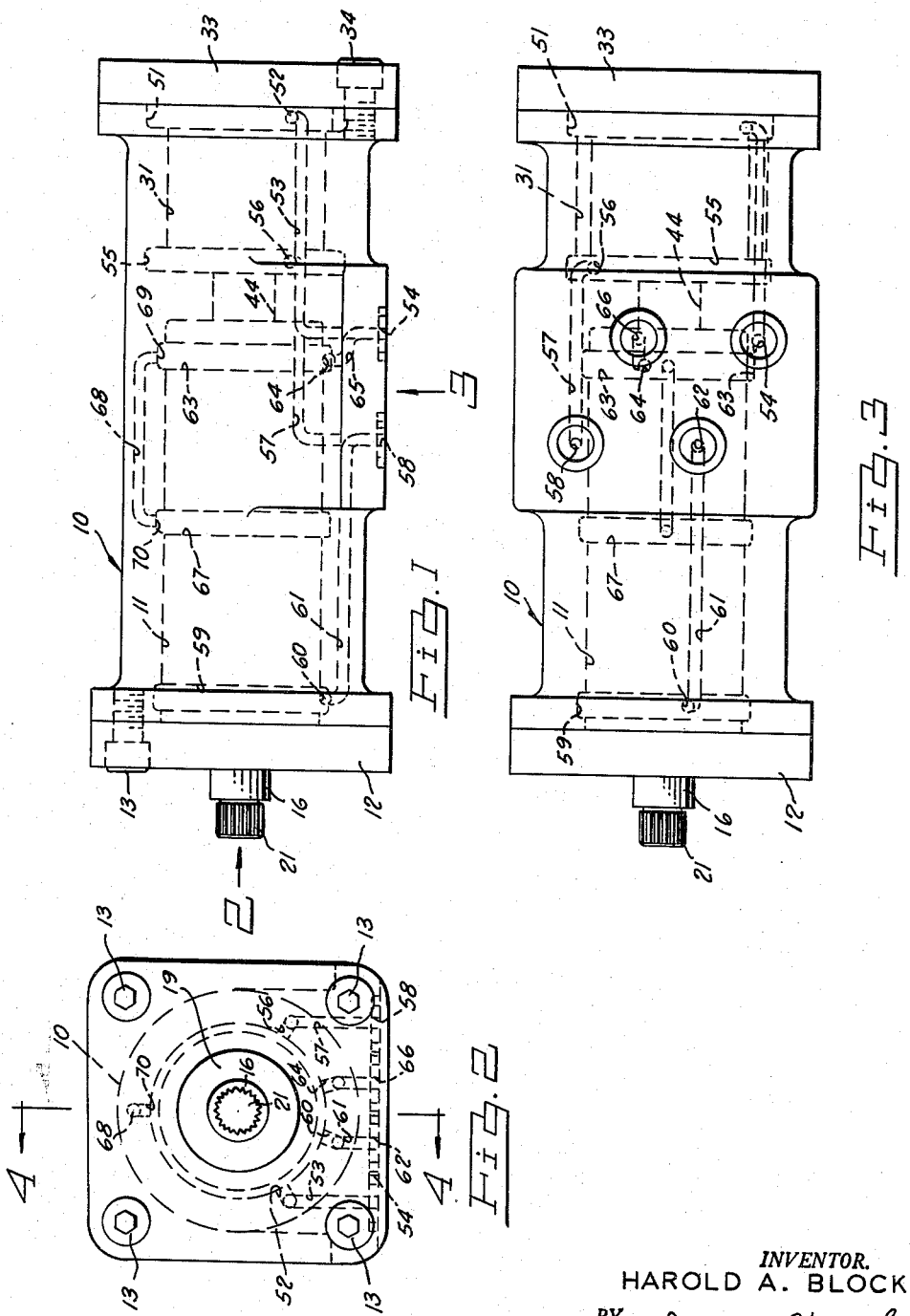

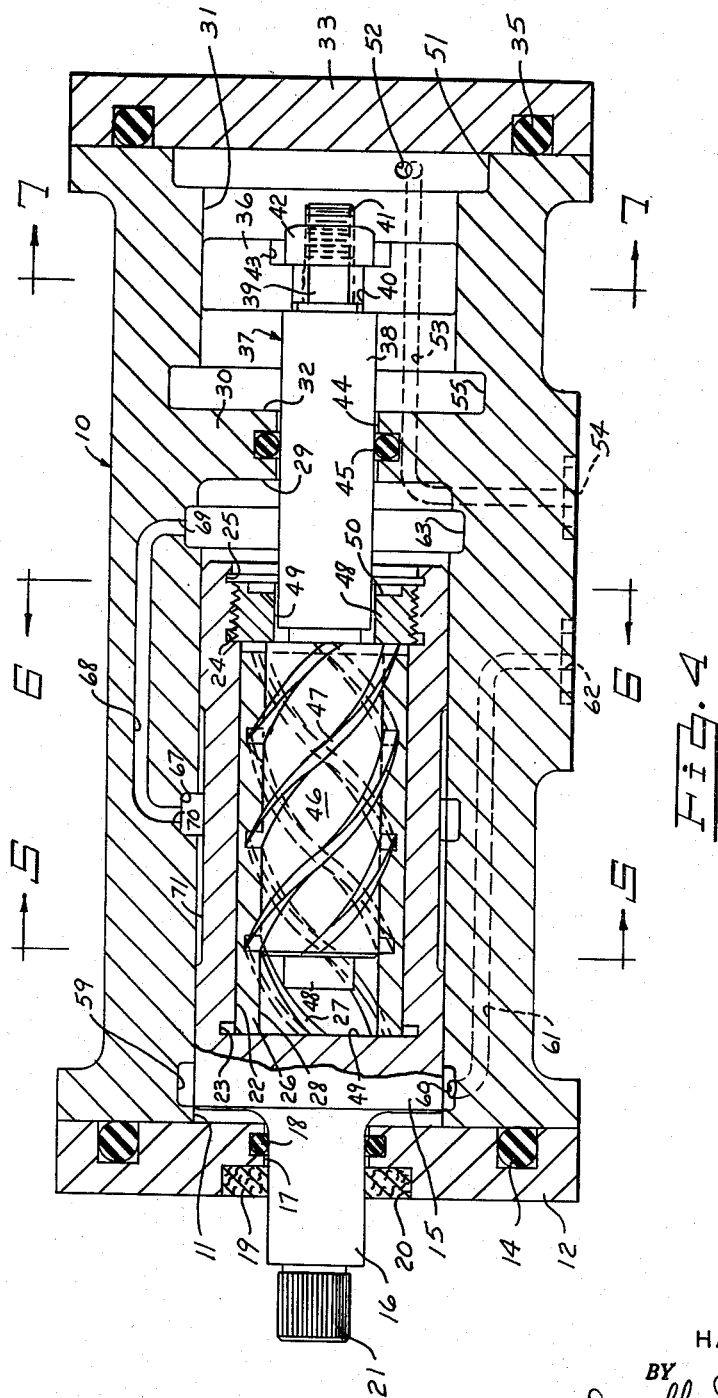

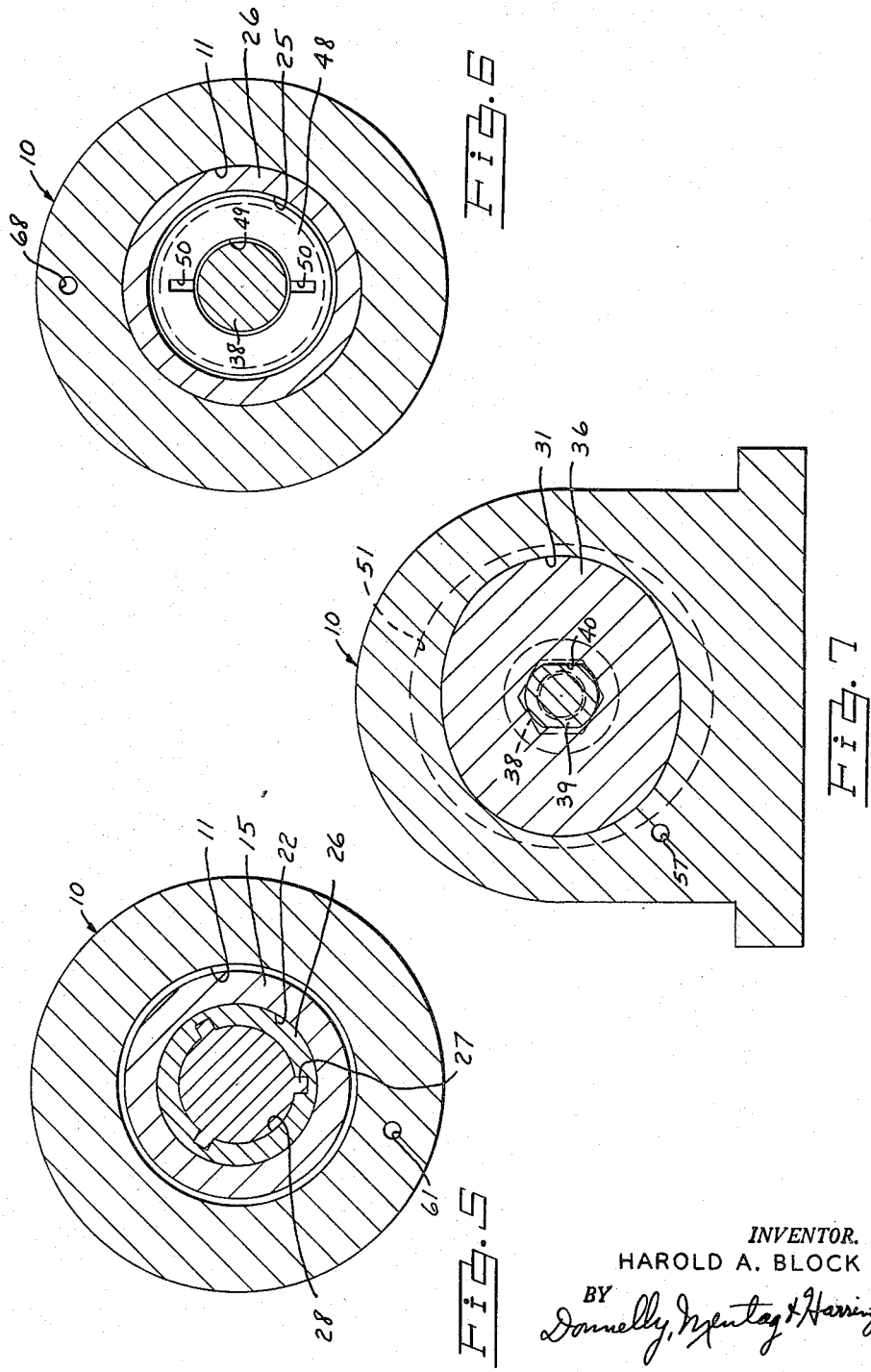

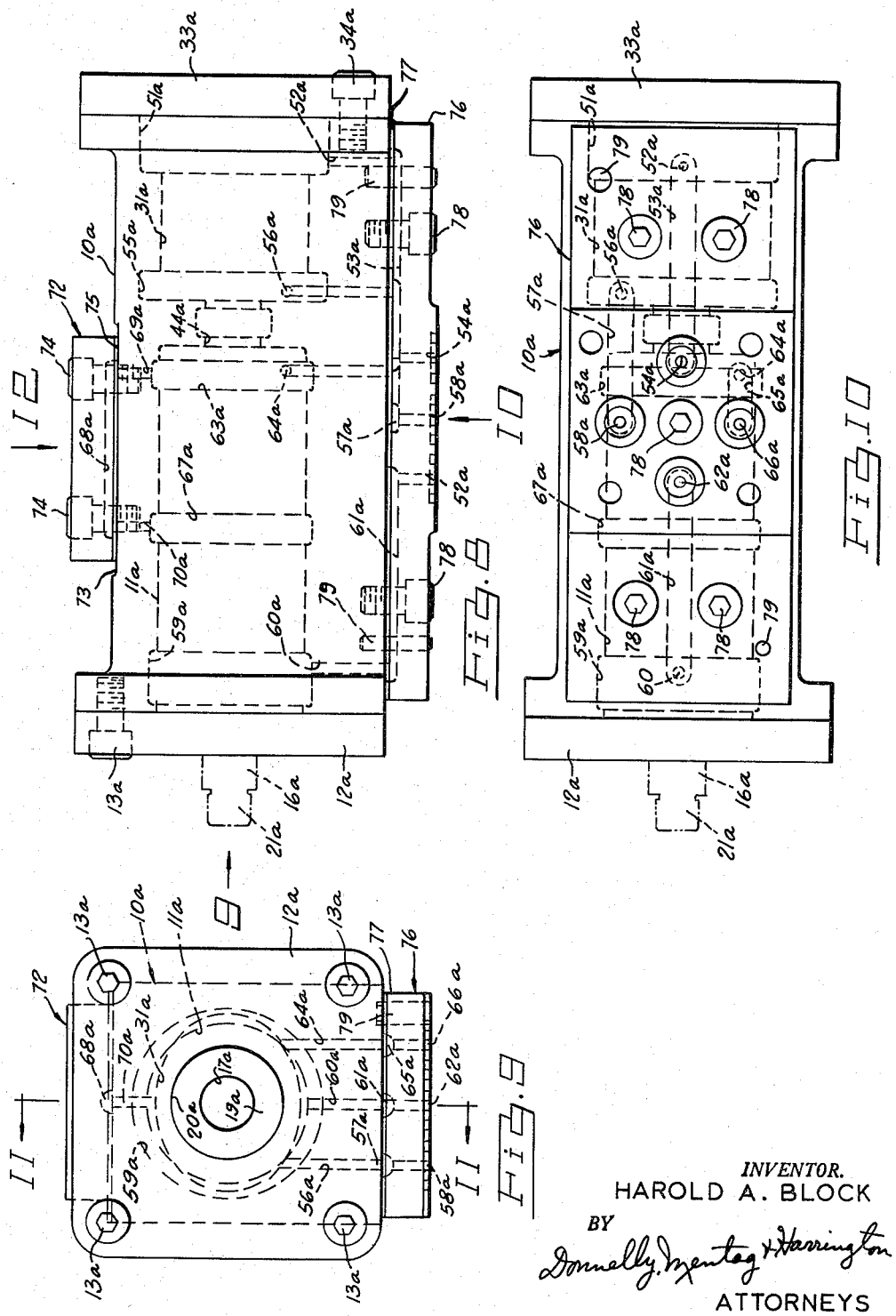

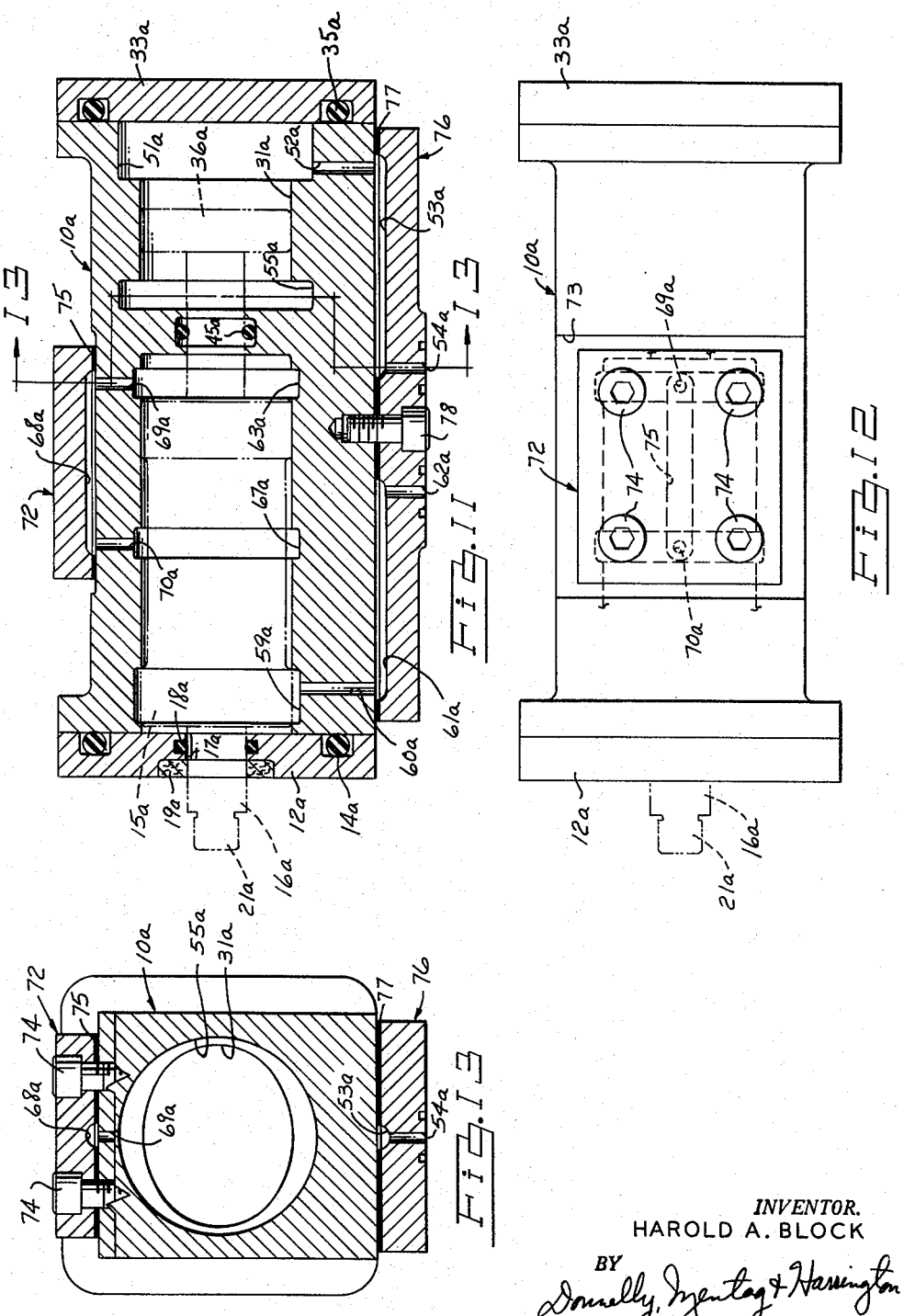

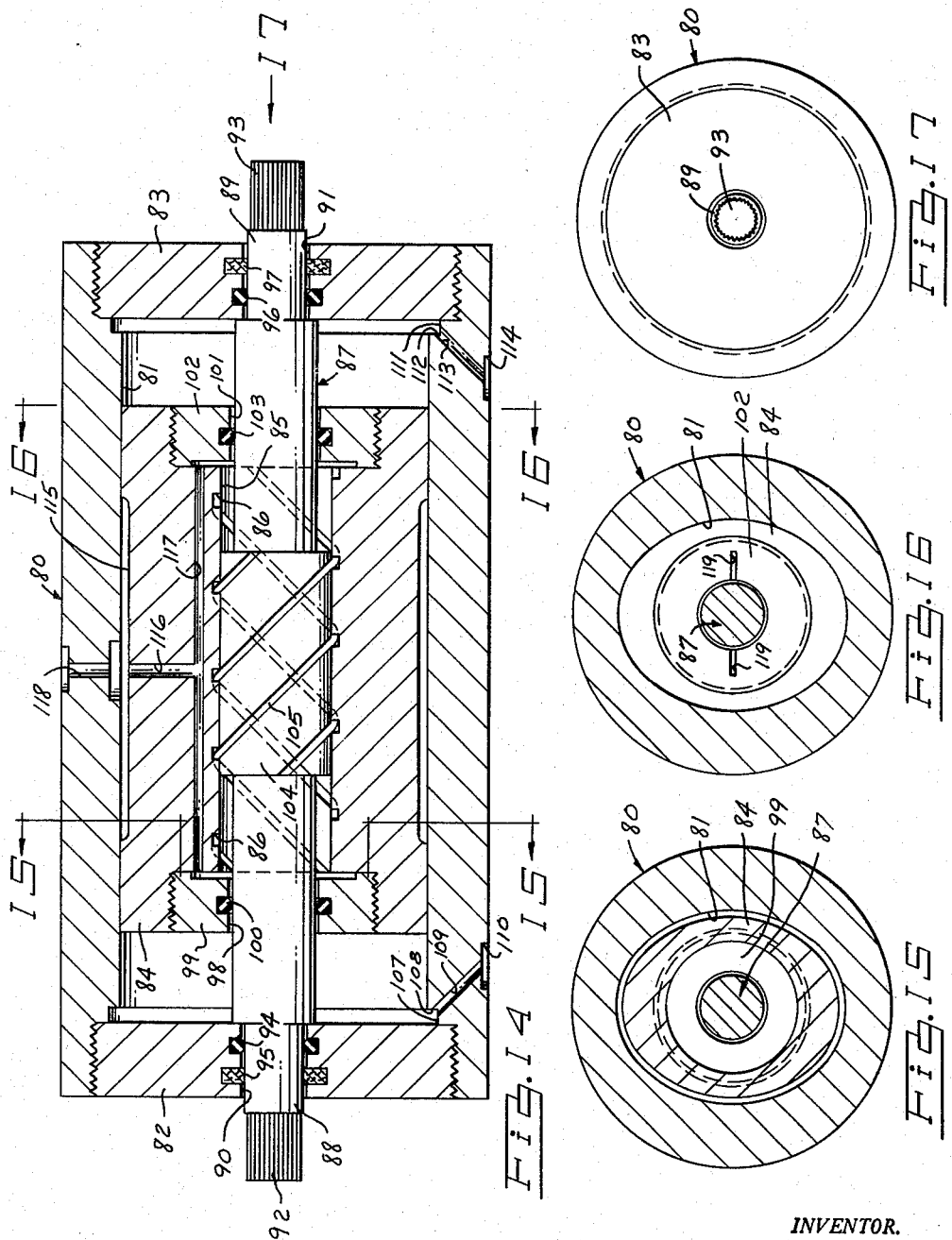

2,955,579

FLUID ACTUATOR FOR LINEAR AND ROTARY MOVEMENTS

Harold A. Block, Ferndale, Mich., assignor to Bachan Manufacturing Company, Hazel Park, Mich., a corporation of Michigan Filed Sept. 4, 1959, Ser. No. 838,250

8 Claims. (Cl. 121—119)

This invention relates generally to improvements in the hydraulic actuator art and more particularly, to a novel and improved hydraulic actuator capable of providing both controlled rotary and linear motion.

It is an important object of the present invention to provide a novel and improved hydraulic actuator which is adapted to produce both rotary and linear movement either simultaneously, or separately, by means of a single compact unit or mechanism which utilizes hydraulic fluid as the actuating media, and which includes a rotary actuator capable of being locked in any position and having a rotational range exceeding 360°.

It is another object of the present invention to provide a novel and improved hydraulic actuator which utilizes an actuator to transform the linear motion of a hydraulically operated actuating piston into a desired or predetermined rotational and linear motion.

It is still another object of the present invention to provide a novel and improved actuator which is simple and compact in construction, light in weight, economical of manufacture, and efficient in operation.

It is a further object of the present invention to provide a novel and improved actuator which includes a housing and a non-rotating hydraulically operated piston mounted therein for linear movement therein in either direction. The piston is provided with a piston rod which projects through an inner wall of the housing and which is provided with a spiral thread on the outer end thereof. The actuator further includes a hydraulically operated piston follower which is provided with an internal triple thread or an internally threaded sleeve adapted to receive the spiral threaded end of the piston rod. The piston follower is slidably mounted in the housing in a coaxial position relative to the piston rod and is provided at one end thereof with an output or working shaft that extends outwardly of the housing and to which is imparted a linear and/or rotary motion for useful working purposes.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 1 is a side elevational view of a hydraulic actuator made in accordance with the principles of the invention;

Fig. 2 is an end elevational view of the structure illustrated in Fig. 1 taken in the direction of the arrow marked 2;

Fig. 3 is a bottom plan view of the structure illustrated in Fig. 1 taken in the direction of the arrow marked 3;

Fig. 4 is an enlarged elevational sectional view of the structure illustrated in Fig. 2 taken along the line 4—4 thereof, and looking in the direction of the arrows;

Fig. 5 is an elevational sectional view of the structure illustrated in Fig. 4 taken along the line 5—5 thereof and looking in the direction of the arrows;

Fig. 6 is an elevational sectional view of the structure illustrated in Fig. 4 taken along the line 6—6 thereof, and looking in the direction of the arrows;

Fig. 7 is an elevational sectional view of the structure illustrated in Fig. 4, taken along the line 7—7 thereof and looking in the direction of the arrows;

Fig. 8 is a side elevational view of a second embodiment of the invention wherein the actuator is provided with a separate detachable hydraulic fluid manifold;

Fig. 9 is an end elevational view of the structure illustrated in Fig. 8 taken in the direction of the arrow marked 9;

Fig. 10 is a bottom plan view of the structure illustrated in Fig. 8 taken in the direction of the arrow marked 10;

Fig. 11 is an elevational sectional view of the structure illustrated in Fig. 9, taken along the line 11—11 thereof and looking in the direction of the arrows;

Fig. 12 is a top plan view of the structure illustrated in Fig. 8, taken in the direction of the arrow marked 12;

Fig. 13 is an elevational sectional view of the structure illustrated in Fig. 11, taken along the line 13—13 thereof and looking in the direction of the arrows;

Fig. 14 is a central elevational sectional view of a third embodiment of the invention and illustrating an actuator made in accordance with the principles of the invention which is adapted to provide rotary actuation only;

Fig. 15 is an elevational sectional view of the structure illustrated in Fig. 14, taken along the line 15—15 thereof and looking in the direction of the arrows;

Fig. 16 is an elevational sectional view of the structure illustrated in Fig. 14, taken along the line 16—16 thereof and looking in the direction of the arrows; and, Fig. 17 is an end elevational view of the structure illustrated in Fig. 14, taken in the direction of the arrow marked 17.

Referring now to the drawings, and in particular to Figs. 1 through 7, a first illustrative embodiment is shown which comprises the elongated tubular housing generally indicated by the numeral 10. As viewed in Figs. 1, 3 and 4, the left end of the actuator will be considered as the front end thereof and referred to as such hereinafter. As shown in Figs. 4 and 5, a first cylinder indicated by the numeral 11 is formed in the housing 10 and this cylinder is open at the front end of the housing 10. The open end of the cylinder 11 is enclosed by the end cap 12 which is detachably secured to the housing 10 by any suitable means as by means of the socket head screws 13. A suitable O ring sealing means 14 is provided between the end cap 12 and the housing 10. The housing 10 and the end cap 12 may be made from any suitable material, as for example, an anodized aluminum alloy.

As shown in Figs. 4 and 5, a first piston, or piston follower, number 15, is slidably mounted in the cylinder 11. It will be seen that the cylinder 11 is circular in cross-section and that the piston follower 15 is also circular in cross-section whereby said piston follower may be moved longitudinally and rotatably in the cylinder 11. As shown in Figs. 1, 3 and 4, the piston follower is provided with a piston rod 16 which functions as an output shaft and which extends outwardly of the housing 10 through the opening 17. A conventional O ring sealing means 18 is mounted around the inner end of the shaft 16 and a suitable sealing assembly 19 is mounted in the recess 20 in the end cap 12 around the outer end of the shaft 16. As shown in Fig. 4, the shaft 16 is provided with a splined outer end 21 for connection to any object which is to be provided with a linear, and/or rotative movement.

As shown in Figs. 4, and 5, the piston follower 15 is provided with the inwardly extended bore 22 from the inner end thereof so as to make the piston follower tubular in construction. The bore 22 is circular in cross-section and is provided with the annular relief grooves 23, 24 and 25 as shown in Fig. 4. A piston follower sleeve 26 is fixedly mounted in the bore 22 by any suitable means such as by shrinking it in place. The piston follower and piston follower sleeve are preferably made from beryllium copper, or any other suitable material. The piston follower sleeve 26 is provided with the bore 28 which is circular in cross section and provided with an internal triple threaded spiral thread 27. The form of the thread 27 is preferably square in cross-section. The cylinder bore 11 terminates at the rear end thereof at the surface 29 of the dividing wall 30. As shown in Figs. 1, 4 and 7, a second cylinder 31 is formed in the rear end of the housing 10 and this cylinder is formed to an oval or elliptical cross-sectional form as shown in Fig. 7. The inner end of the cylinder 31 terminates at the rear surface 32 of the dividing wall 30. The cylinder 31 is enclosed at the rear end of the housing 10 by means of the rear end cap 33 which is preferably made from a suitable anodized aluminum alloy. The end cap 33 is fixedly secured in place on the housing 10 by a suitable means as by the socket head screws 34. An O ring 35 is carried on the inner side of the end cap 33 to provide a suitable sealing means between said cap and the housing 10.

As shown in Figs. 4 and 7, a second piston 36 is slidably mounted in the cylinder 31 and this piston is preferably made from beryllium copper. The piston 36 is oval or elliptical in cross-section to prevent rotation of the piston 36. The piston 36 is fixedly connected to the piston rod generally indicated by the numeral 37 and which is made from any suitable steel alloy or the like. The inner end of the piston rod 37 is round in cross-section as indicated by the numeral 38 and this portion abuts the inner face of the piston 36. Extended outwardly from the piston rod portion 38 is the reduced end portion 39 which is provided with two flat portions that meet with similar flat portions in the hole 40 in the piston 36 to prevent rotation therebetween. The piston rod is further provided with the threaded extension 41 which extends completely through the piston 36 and on which is threadably mounted the jam nut 42 for securing the piston rod to the piston 36. The jam nut 42 is adapted to seat in the recess 43 which is formed on the outer face of the piston 36.

As shown in Fig. 4, the piston rod portion 38 is rotatably mounted through the opening or bore 44 which is formed in the dividing wall 30. A suitable O ring sealing means 45 is mounted in the wall 30 for sealing engagement with the piston rod portion 38. The outer end of the piston rod 37 is enlarged as indicated by the numeral 46 and is round in cross-section and is rotatably mounted in the piston follower sleeve bore 28. The piston rod portion 46 is provided with the triple square shaped thread 47 which is adapted to mate with the thread 27 in the sleeve 26. The piston rod threaded portion 46 and the piston follower sleeve 26 are adapted to be matched so as to produce a matching assembly. As shown in Fig. 4, the inner end of the piston follower is enclosed by the piston rod retainer 48 which is provided with the bore 49 therethrough for the passage therethrough of the piston rod portion 38. The piston rod retainer 48 is preferably made from an anodized aluminum alloy. As shown in Figs. 4 and 6, the piston rod retainer 48 is provided with a pair of diametrically disposed slots 50 on the outer face thereof for threading the retainer in place. When the piston rod 37 is moved to the position shown in Fig. 4 relative to the piston follower, the piston rod portion 46 will abut the inner face of the piston rod retainer.

As shown in Figs. 1 through 4, the piston cylinder 31 is provided with the annular groove 51 at the outer end thereof which is provided with the cylinder port 52. The port 52 communicates with the fluid passage 53 which terminates with the housing inlet port 54 for connection to a suitable source of fluid under pressure. The piston cylinder 31 is also provided with the annular groove 55 at the inner end thereof and which is provided with the cylinder inlet port 56. The port 56 communicates with the fluid passage 57 which terminates at the housing inlet port 58. The port 58 is adapted to be connected to any suitable source of fluid under pressure. As shown in Figs. 1 through 4 the piston follower cylinder 11 is provided with the annular groove 59 at the forward end thereof which communicates with the cylinder inlet port 60. The port 60 communicates with the fluid passage 61 which terminates in a housing inlet port 62. The port 62 is adapted to be connected to a suitable source of fluid under pressure. The piston follower cylinder 11 is also provided with the annular groove 63 at the rear end thereof. The groove 63 communicates with the cylinder inlet port 64 which communicates with the fluid passage 65 and which terminates in the housing inlet port 66. The port 66 is adapted to be connected to a suitable source of fluid under pressure. The piston follower cylinder 11 is further provided with a centrally disposed annular groove 67 which communicates with the annular groove 63 by means of the fluid passage 68 and the cylinder ports 69 and 70. The annular groove 67 communicates with the annular peripheral groove 71 which is formed on the piston follower 15. The passage 68 is adapted to supply hydraulic fluid under pressure to groove 71 to give a centering effect to the piston follower 15 to minimize wear on the follower and cylinder walls by reducing operational friction. The groove 71 on the piston follower forms a balance chamber and the line or passage 68 may be termed the "balance line."

The actuator illustrated in Figs. 1 through 4 is adapted to provide both linear and rotary motion. By supplying fluid under controlled pressure to housing inlet ports 66 and 54 and exhausting fluid through port 58 against a controlled back pressure, the piston follower 15 moves towards the front or left end of the housing as viewed in Fig. 4. The piston 36 is thus pulled or dragged in the same direction overcoming any back pressure on the cylinder inlet port 56. The piston follower moves to the left until it closes off the cylinder port 60 whereby the follower seats on a fluid bearing against the forward end cap 12, and is held there by the fluid pressure being applied through the housing inlet port 66. At this point, fluid pressure being applied through the inlet port 54 will react against the right end of the piston 36 so as to overcome the back pressure in the cylinder in front of the piston 36. Since the piston 36 is non-rotating, the spiral thread 47 on the piston rod portion 46 acts as a cam or inclined plane and the piston follower 15 rotates until the rod portion 48 bottoms against the inner end 49 of the piston follower bore 22. The actuator may be locked in any position throughout the aforementioned stroke or travel by closing all of the housing inlet ports 54, 62, 66 and 58.

In order to reverse the aforementioned actuation, fluid under pressure is supplied to the housing inlet ports 58 and 62 under a controlled pressure and volume. A maximum volume under design pressure would be supplied to the port 58 while a predetermined smaller volume of fluid under pressure would be supplied by port 62. Simultaneously, fluid would be exhausted through port 54 causing the piston 36 to move to the right as viewed in Fig. 4. A predetermined back pressure would be maintained on the port 66 to determine the speed of the piston movement. The piston follower 15 will be held against the left end of the cylinder 11 so as to block the cylinder port 60, thereby causing the piston follower 15 to rotate. This action continues until the spiral thread movement is restricted when the back pressure at port 66 is overcome by the pressure on piston 36 through port 58 and the piston follower is then pulled toward the right end of the cylinder 11 as viewed in Fig. 4 until it bottoms against the dividing wall 30.

The hydraulic actuator of the present invention precludes the use of dual actuators and the linkage required at present in this type of operation thereby minimizing space requirements, reducing weight and sealing problems and permits hydrostatic locking in any position. The action of the actuator may be varied so as to first provide a rotary movement and then a linear movement, and then a return movement to the starting position; or to provide simultaneous linear and rotary movements. The hydraulic actuator of the present invention provides for an increased amount of rotational movement over the prior art paddle type actuators which normally can only operate through 270°. The present hydraulic actuator can operate within a full range of 360° or a range beyond 360°, as desired.

The second embodiment of the invention is illustrated in Figs. 8 through 13 and in this embodiment the fluid delivery passages are separately formed in a pair of detachable manifolds as compared to the first described embodiment in which the fluid passages were cast in the housing. The parts of the second embodiment which are similar to the parts of the first embodiment are marked with corresponding reference numerals followed by the small letter "a." As shown in Figs. 8, 11 and 12, the balance passageway 68a is formed on the inner side of the first detachable manifold 72 which is made in block form and which is adapted to be seated on the flattened surface 73 on one side of the housing 10a. The manifold 72 is adapted to be fixedly secured in place by means of the socket head screws 74 and is sealed in place by the gasket 75. The second manifold 76 is provided with the sealing gasket 77 and is fixedly secured to the lower side of the housing 10a by means of the socket head screws 78 and the dowel pins 79. It will be seen that the second manifold 76 is provided with the fluid passage ways 53a, 57a, 61a and 65a which function in the same manner as the corresponding fluid passage ways in the first embodiment. The operation of this second embodiment is the same as the aforedescribed operation of the first embodiment.

A third embodiment of the invention is illustrated in Figs. 14, 15, 16 and 17 and comprises the tubular housing, or body 80, which is provided with an oval, elliptical or other non-circular bore therethrough as 81 which is enclosed at the ends thereof by means of the threadably mounted end caps 82 and 83. An elongated oval shape piston follower 84 is slidably and non-rotatably mounted in the bore 81. The piston follower 84 is provided with an axial round bore 85 therethrough which is provided with the triple thread 86, which is formed along the entire length thereof.

An output shaft generally indicated by the numeral 87 is mounted through the actuator and is provided with the reduced output ends 88 and 89 which extend through the bores 90 and 91, respectively, in the end caps 82 and 83. The reduced shaft ends 88 and 89 are provided with the splined outer ends 92 and 93, respectively. The shaft end 88 is sealed by means of the O ring 94 and the sealing means 95. The shaft end 89 is sealed by means of the O ring 96 and the sealing means 97.

The left end of the shaft 87, as viewed in Fig. 14 is rotatably mounted in the bore 98 which is formed through the piston rod retainer 99 which is threadably mounted in the left end of the piston follower 84 to enclose that end of the bore 85. A suitable sealing means, such as an O ring 100 is provided in the piston rod retainer 99 for sealing purposes. The right end of the shaft 87 is rotatably mounted through the bore 101 which is formed in the piston rod retainer 102 which is threadably mounted in the right end of the piston follower 84 to enclose the right end of the bore 85. An O ring 103 similar to O ring 100 is mounted in the piston rod retainer 102 for sealing purposes.

The shaft 87 is provided with the enlarged central portion 104 which is provided with the triple thread 105 that mates with the thread 86 in the piston follower 84. As shown in Fig. 14, the left end of the cylinder bore 81 is provided with an enlarged annular groove 107 which communicates with the port 108. The port 108 communicates with the fluid passage 109 which in turn communicates with the inlet port 110. The right end of the housing cylinder 81 is provided with a similar annular groove 111 which communicates with the inlet port 114 by means of the fluid passage 113 and port 112. The actuator is provided with a balance chamber 115 which is formed as an annular peripheral groove around the piston follower 84. The chamber 115 communicates with the further balance fluid passage 116 and 117 and the inlet fluid passage 118. As shown in Fig. 16, the piston rod retainers 99 and 102 have provisions for using a spanner wrench for threading the same in place, as indicated by the slots 119.

In operation, the actuator shown in Figs. 14 through 17 may be used to provide rotary motion for purposes where linear motion is not required, as for example, in aircraft use. This third embodiment, however, is also adapted for use in automation purposes and the like, in the same manner as the first two described embodiments. It will be obvious that when fluid pressure is admitted against either end of the piston follower 84, while exhausting from the opposite end thereof, that the non-rotating piston follower 84 will cause rotation of the work shaft 87. The rotation may be reversed by merely reversing the flow of pressurized fluid through the aforedescribed fluid inlet ports 110 and 114.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A fluid actuator of the class described, comprising: a housing; a non-rotating piston slidably mounted in said housing; fluid passages for admitting and exhausting fluid under pressure against the opposite ends of said piston; an output shaft rotatably mounted in said housing; said piston being provided with means for receiving a fluid under pressure for balancing said piston; said output shaft being provided with a first thread means; and, said piston being provided with a second thread means which are meshable with said first thread means whereby when said piston is moved in said housing, said output shaft will be rotated.

2. A fluid actuator of the class described, comprising: a housing; a pair of cylinders formed in said housing; a non-rotating piston slidably mounted in a first one of said cylinders; a piston follower slidably mounted in the second one of said cylinders; an output shaft connected to said piston follower and having one end thereof extended outwardly of said housing; a piston rod connected to said piston and extended into the second cylinder; means connecting said piston rod and said piston follower for rotating said piston follower and said shaft when said piston rod is moved relative to said piston follower; and, fluid passages for selectively admitting and exhausting fluid under pressure against the opposite ends of said piston and said piston follower, for linear movement of the same.

3. A fluid actuator as defined in claim 2, wherein: said means connecting said piston and said piston follower comprises a first thread means on said piston rod and a second thread means on said piston follower and wherein said first and second thread means are meshably engageable with each other.

4. A fluid actuator as defined in claim 2, wherein: said fluid passages are formed entirely in said housing.

5. A fluid actuator as defined in claim 2, wherein: said fluid passages are formed partially in a plurality of detachably mounted manifolds.

6. A fluid actuator as defined in claim 2, wherein: said piston follower is provided with an inwardly extended bore formed from the inner end thereof; a sleeve is fixedly mounted in said bore; and, said means connecting said piston and said piston follower comprises an internal thread means formed in said sleeve and an external thread means formed on said piston rod and wherein said external means is meshably engageable with said internal thread means.

7. A fluid actuator as defined in claim 2, wherein: said piston follower is provided with an annular peripheral groove; and, said actuator includes fluid passage means for transmitting fluid under pressure to said annular periphera groove to provide a centering effect on the piston follower.

8. A fluid actuator of the class described, comprising: a housing; a non-rotating piston slidably mounted in said housing; fluid passages for admitting and exhausting fluid under pressure against the opposite ends of said piston; an output shaft rotatably mounted in said housing; said piston being provided with means for receiving a fluid under pressure for balancing said piston; said output shaft being provided with a first thread means; said piston being provided with a second thread means which are meshable with said first thread means whereby when said piston is moved in said housing, said output shaft will be rotated; and, said output shaft being provided with a pair of ends extended outwardly of said housing for engagement with an object to be driven thereby.

References Cited in the file of this patent

UNITED STATES PATENTS

| | | |
|---|---|---|
| 353,134 | Hands et al. | Nov. 23, 1886 |
| 474,557 | Harris | May 10, 1892 |
| 623,816 | Olsen | Apr. 25, 1899 |
| 1,561,826 | Bremer | Nov. 17, 1925 |
| 2,262,963 | Procissi | Nov. 18, 1941 |
| 2,688,951 | Sears | Sept. 14, 1954 |